United States Patent [19]
Aoyama et al.

[11] Patent Number: 4,992,817
[45] Date of Patent: Feb. 12, 1991

[54] FOCUS DETECTING DEVICE SWITCHING BETWEEN PASSIVE AND ACTIVE DETECTION

[75] Inventors: Keisuke Aoyama; Kenji Suzuki; Akira Ishizaki; Yasuo Suda; Keiji Ohtaka, all of Yokohama, Japan

[73] Assignee: Canon Kabushiki Kaisha, Tokyo, Japan

[21] Appl. No.: 387,953

[22] Filed: Aug. 1, 1989

[30] Foreign Application Priority Data

Aug. 6, 1988 [JP] Japan .................................. 63-195320
Aug. 6, 1988 [JP] Japan .................................. 63-195321

[51] Int. Cl.⁵ .............................................. G03B 13/36
[52] U.S. Cl. ..................................................... 354/403
[58] Field of Search .......................................... 354/403

[56] References Cited

U.S. PATENT DOCUMENTS

| | | | |
|---|---|---|---|
| 4,518,242 | 5/1985 | Toyama | 354/403 |
| 4,592,638 | 6/1986 | Kaneda et al. | 354/403 |
| 4,818,865 | 4/1989 | Matsui et al. | 354/403 |
| 4,835,561 | 5/1989 | Matsui | 354/403 |
| 4,843,227 | 6/1989 | Matsui et al. | 354/403 |

FOREIGN PATENT DOCUMENTS 48-52231 7/1973 Japan .

Primary Examiner—Russell E. Adams
Attorney, Agent, or Firm—Fitzpatrick, Cella, Harper & Scinto

[57] ABSTRACT

A focus detecting device switchable between an active and a passive mode has a passive mode in which light from an object is accumulated in a light accumulation type receiving portion without light from a light source being projected onto the object, and an active mode in which light from a light source is projected onto the object. The light accumulated in the accumulation type receiving portion is used to effect focus detection. An accumulating control circuit is provided for controlling the accumulation operation performed by the light receiving portion. A processing circuit is provided for performing the focus detection calculations on the basis of the accumulated output of the light receiving portion as controlled by the control circuit. A change-over circuit is provided for automatically changing between the passive and active modes on the basis of the accumulation state during the accumulating operation before the control of the accumulation operation by the control circuit is terminated.

15 Claims, 19 Drawing Sheets

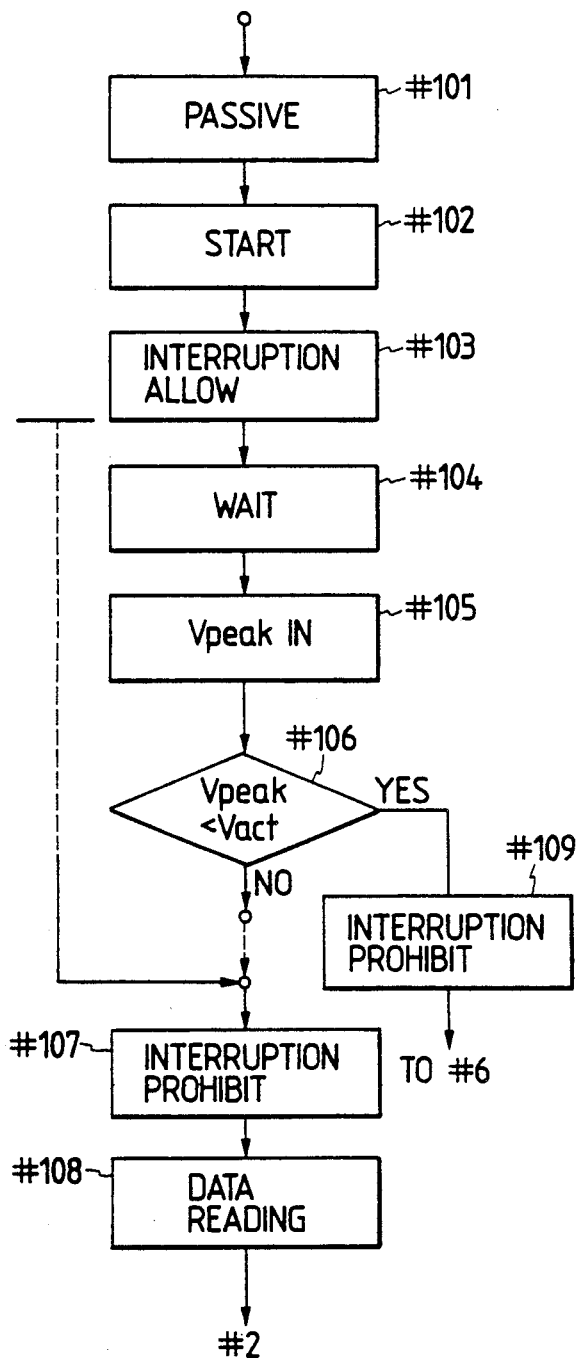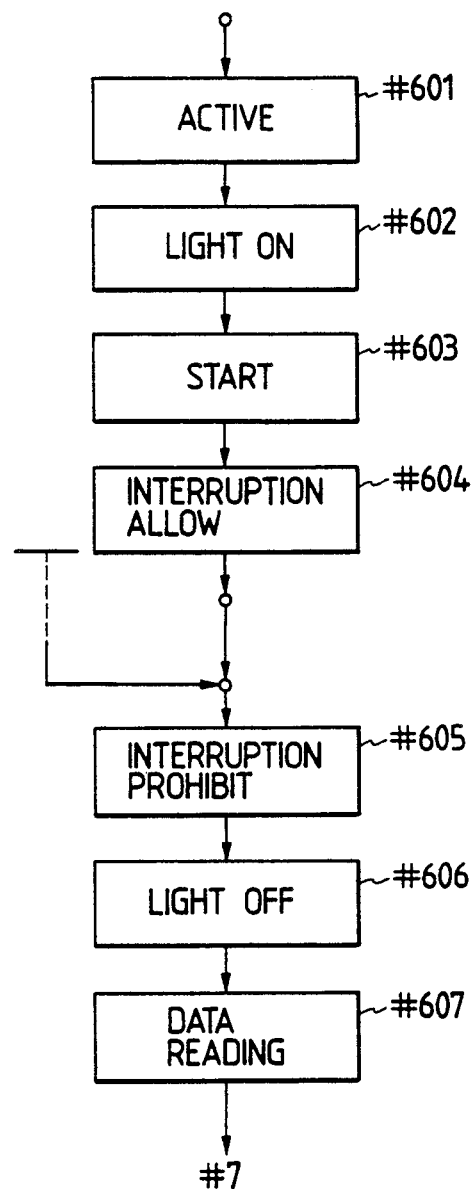

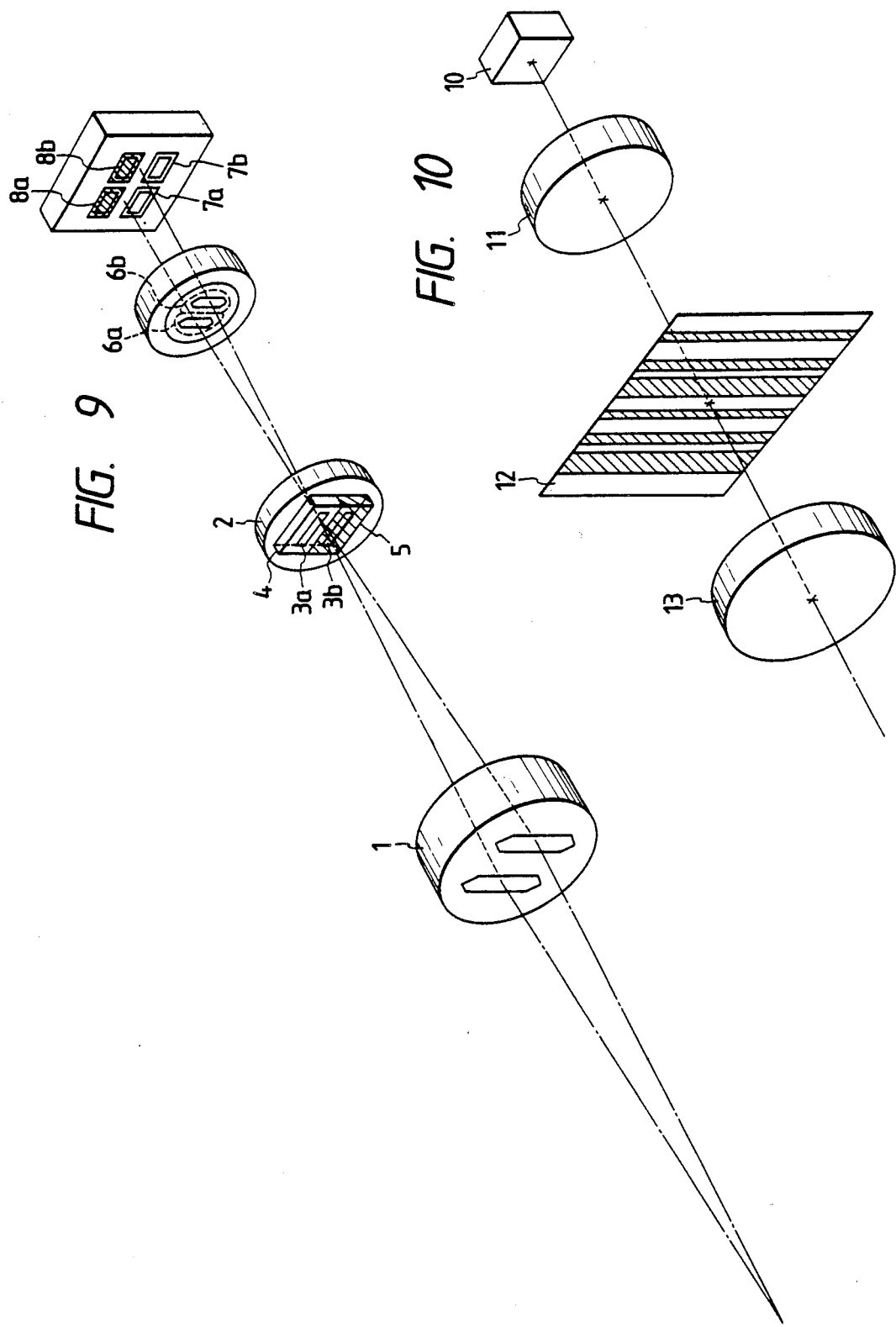

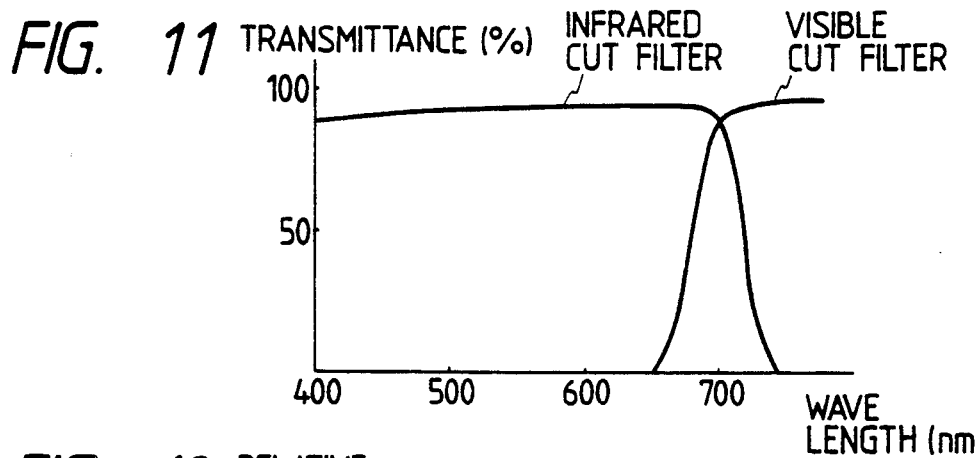
FIG. 11
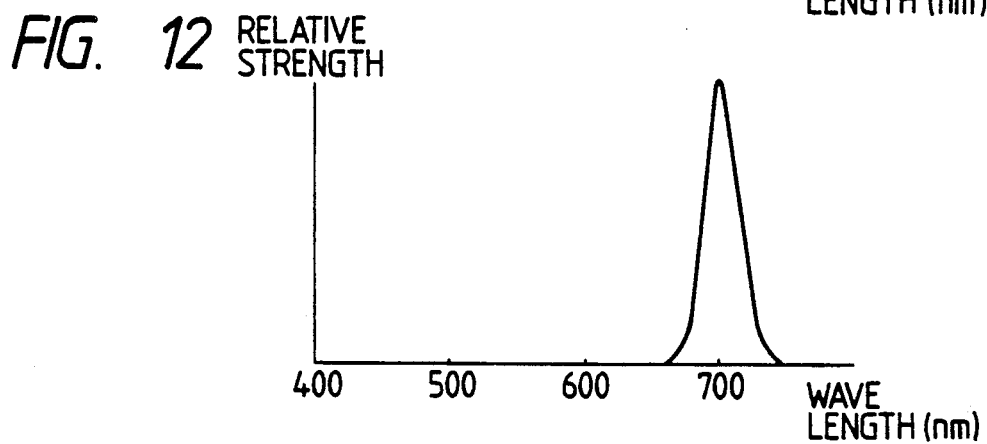
FIG. 12
FIG. 13A
FIG. 13B
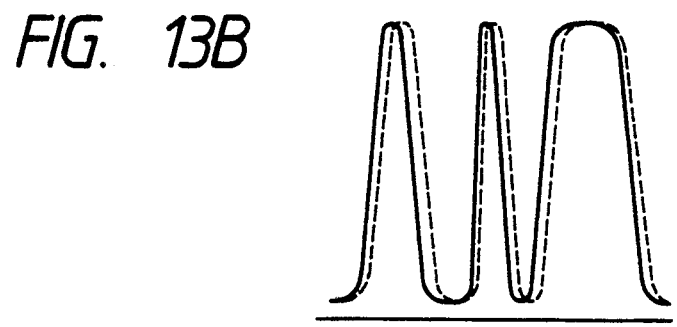

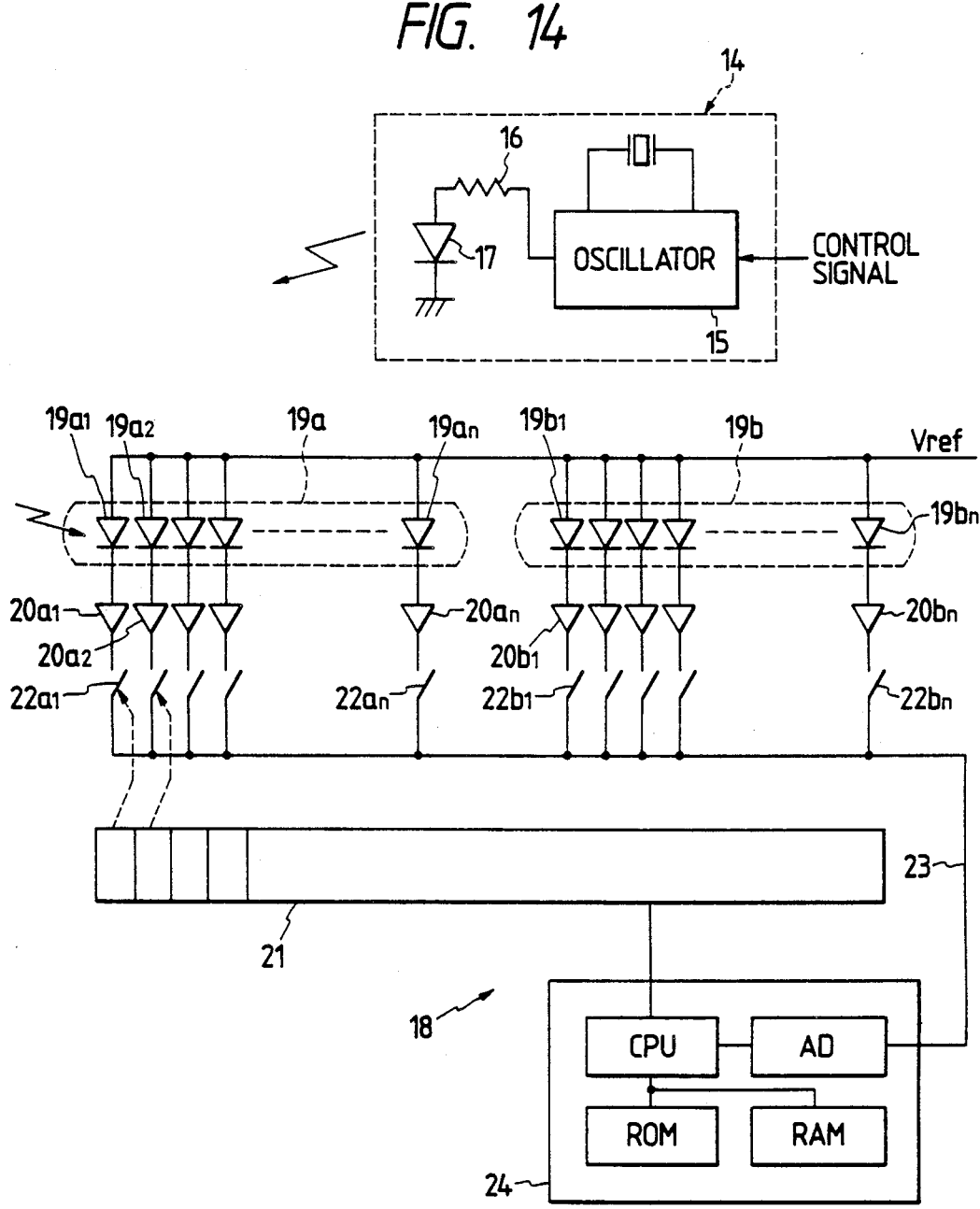

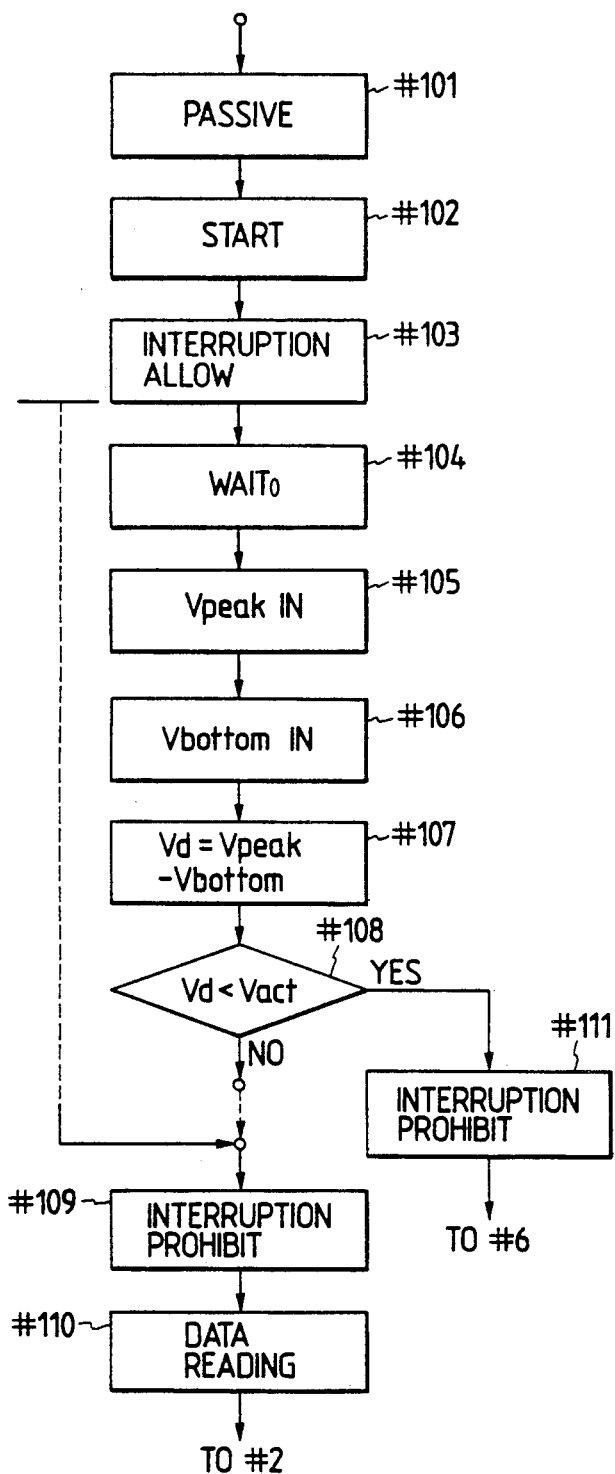
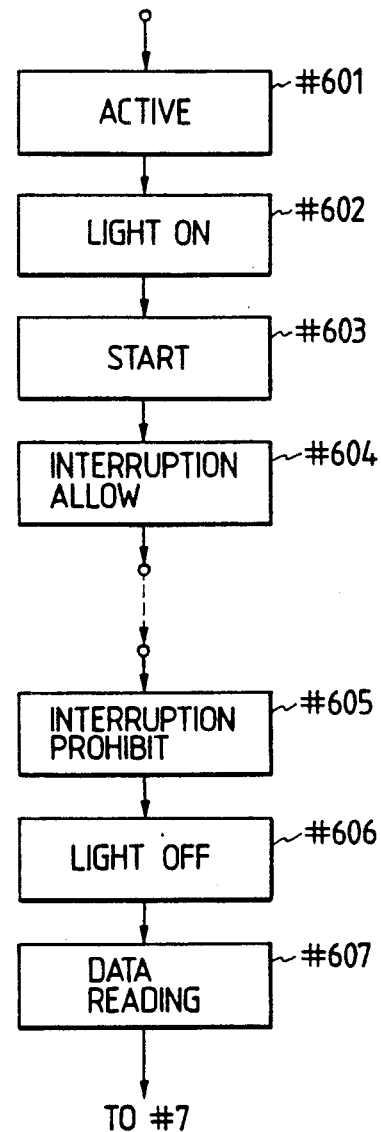
FIG. 23A
FIG. 23B

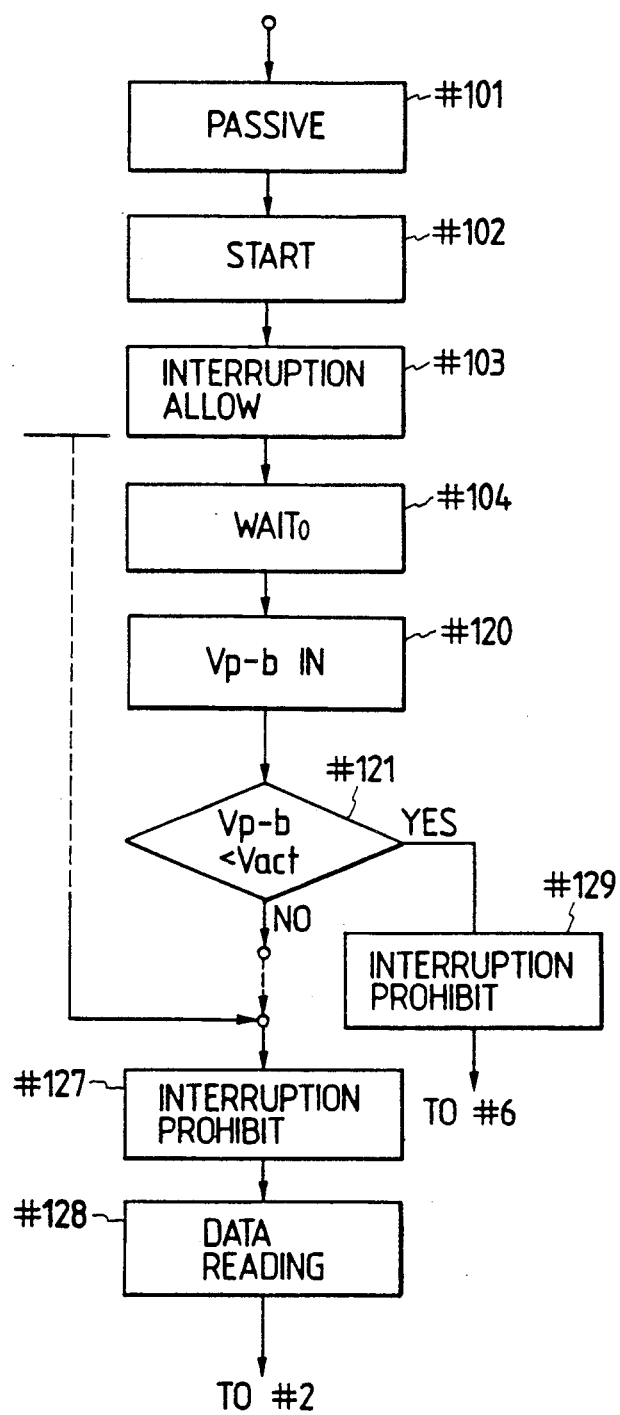

FOCUS DETECTING DEVICE SWITCHING BETWEEN PASSIVE AND ACTIVE DETECTION

BACKGROUND OF THE INVENTION

1. Field of the Invention

This invention relates to a focus detecting device for a camera or the like for changing over and effecting (1) the active type focus detection using a light projection device for focus detection (including a conventional auxiliary light device) which projects a light onto an object which is the object of the focus detection for an objective lens, and (2) the passive type focus detection which does not use the light projection device for focus detection.

2. Related Background Art

As one type of focus detecting device of a camera, there is known a device in which the exit pupil of a photo-taking lens is divided into two by an optical system for focus detection and two object images formed by light beams passed through the respective pupil areas are received by a photoelectric converting element array (for example, a CCD sensor array) and the focus state of the photo-taking lens is detected from the output thereof.

Also, a device which has a plurality of focus detecting optical systems as described above and is contrived so as to extract the two-dimensional pattern of an object and which avoids the disadvantage peculiar to the aforedescribed system wherein focus detection disability is experienced when the object pattern exists only in a direction orthogonal to the photoelectric converting element array is disclosed in Japanese Laid-Open Patent Application No. 62-95511.

Further, an active type focus detecting device used in combination with light projection means for focus detection and designed so as to be capable of accomplishing focus detection even for an object under low illumination (which is a disadvantage peculiar to the passive type in which focus detection is effected passively by only the light from an object) and to project a predetermined pattern onto the object during low illumination and detect the reflected pattern image from the object to thereby accomplish focus detection is disclosed, for example, in Japanese Laid-Open Patent Application No. 62-324091.

To improve the focus detecting ability of the active type device, the assignee of the subject application has previously proposed a focus detecting optical system as shown in FIG. 9 of the accompanying drawings. Referring to FIG. 9, a field lens 2 is disposed with the same axis as a photo-taking lens 1. Field masks 3a and 3b for limiting field of view are disposed near the field lens 2. Light beams passed through the field masks 3a and 3b are wavelength-limited by optical filters 4 and 5, respectively. The optical filter 4 is an infrared cut filter for cutting the infrared light, and the spectral characteristic thereof is as shown in FIG. 11 of the accompanying drawings. The purpose of inserting this infrared cut filter is to prevent the infrared aberration of the photo-taking lens 1 from adversely affecting the focus detecting system. Also, the optical filter 5 forms a band-pass filter for transmitting therethrough only the wavelength of the emitted light of the light emission source of a light projection system which will be described later.

Rearwardly of the field lens 2, two secondary imaging lenses 6a and 6b are disposed at positions symmetrical with respect to the optic axis. Rearwardly of the secondary imaging lenses, there are disposed photoelectric converting element arrays 7a and 7b on which the image of the field mask 3a is formed and photoelectric converting element arrays 8a and 8b on which the image of the field mask 3b is formed.

This example is used in combination with a light projection system for focus detection as shown in FIG. 10 of the accompanying drawings, and the light projection system for focus detection projects a pattern light onto an object. In FIG. 10, the reference numeral 10 designates a projection light source such as a light emitting diode, and the light beam projected therefrom illuminates a pattern member 12 having an irregular chart shape through a relay lens 11 for illumination. A focus detecting device of the pupil-division type is liable to malfunction for a synchronous pattern and therefore, a random pattern is preferable. The random chart of the illuminated pattern member 12 is projected onto the surface of an object by a light projection lens 12. The imaging relationship between the pattern member 12 and the surface of the object need not be very strict. The projected pattern need not always be represented by a chart shape, but, for example, the pattern may be prescribed by the shape of the light emitting portion of the projection light source 10.

Now, it is desirable that as the projection light source 10, use be made of a light emission source of reduced visibility so as to avoid the infrared aberration of the photo-taking lens 1 and not to dazzle the eyes. Also, it is popular from a practical viewpoint such as size to use a light emitting diode having such a spectral strength distribution as shown in FIG. 12 of the accompanying drawings.

FIG. 13 of the accompanying drawings shows the photoelectric conversion signal outputs of the photoelectric converting element arrays 7a, 7b and the photoelectric converting element arrays 8a, 8b when the object has no contrast and a pattern light is projected by the light projection system for focus detection shown in FIG. 10. FIG. 13A shows the signal outputs of the photoelectric converting element arrays 7a, 7b, and FIG. 13B shows the signal outputs of the photoelectric converting element arrays 8a, 8b. A signal processing method for detecting the amount of image deviation PR from the signal outputs of the photoelectric converting element arrays 7a, 7b and the photoelectric converting element arrays 8a, 8b is disclosed in Japanese Laid-Open Patent Application No. 58-142306, Japanese Laid-Open Patent Application No. 59-107313, Japanese Laid-Open Patent Application No. 60-101513 or Japanese Patent Application No. 61-16082. The wavelengths of all visible light enter the photoelectric converting element arrays 7a and 7b and therefore, the energy of outside light and the reflected energy of the projected light beam are mixed together and the light projection pattern is compressed as shown in FIG. 13A. The degree of compression is governed by the intensity of the projected light energy, the object distance and the intensity of the outside light.

On the other hand, in the photoelectric converting element arrays 8a and 8b wavelength-selected by the projection light source 10, a projected light pattern is extracted as shown in FIG. 13B. This is because the rate of the outside light is decreased relative to the reflected light of the projected light pattern and therefore the S/N ratio of the signal is improved. If the S/N ratio of the signal to the outside light is improved, focus detection will become possible up to a greater distance even when the outside light is bright.

Further, the assignee of the subject application has also previously proposed another method of discriminating between a projected light beam and outside light. That is, this previously proposed device has electrical means for modulating a projection light source in terms of time and selectively discriminating the electrical output portion of a photoelectric converting element array produced by the contribution of the projection light source from the portion by outside environmental light, and the defocus amount of a photo-taking lens is detected by the use of the photoelectric conversion output of the optical image by the discriminated projection light source.

The electrical construction of the above-described previously proposed device is diagrammatically shown in FIG. 14 of the accompanying drawings. The oscillation circuit 15 of a light projection device 14 provides its output to a projection light source 17 through a resistor 16. The oscillation frequency of the oscillation circuit 15, i.e., the modulation frequency of the projected light beam of the projection light source 17, is not specially limited, but if the frequency is too low, the responsiveness of the focus detecting device will be reduced and further, the capacity used for an AC amplifier which will be described later will become great, and this may cause a difficulty in making an integrated circuit. If the frequency is too high, it will become impossible to construct a linear amplifier.

In FIG. 14, the portion other than the light projection device 14 shows a focus detecting device 18. Photoelectric converting element arrays 19a and 19b comprise a plurality of photoelectric converting elements $19a_1$-$19a_n$ and $19b_1$-$19b_n$, respectively, and the photoelectric conversion outputs of the individual photoelectric converting elements are discriminated from the outside environmental light and made into direct currents by discrimination DC circuits $20a_1$-$20a_n$ and $20b_1$-$20b_n$, whereafter they are output to a common output bus 23 through switches $22a_1$-$22a_n$ and $22b_1$-$22b_n$ which are clocked by a shift register 21. The photoelectric conversion outputs are time-serially sampled by an analog digital converter AD in a microcomputer 24 and are successively stored in a memory RAM for data. CPU designates a calculating unit, ROM denotes a memory for the operating program, and Vref designates a constant voltage.

The discrimination and DC-conversion of each photoelectric converting element will hereinafter be described in greater detail with reference to FIG. 15 of the accompanying drawings. In FIG. 15, only the photoelectric converting element $19a_1$ is shown, but the other photoelectric converting elements are similar thereto. The anode side of the photoelectric converting element $19a_1$ is common-wired to a constant voltage source which outputs the constant voltage Vref, and the cathode side thereof is connected to the inverting input terminal of a current-voltage converting amplifier 25. The voltage output of the current-voltage conveting amplifier 25 is input to and amplified by a non-inverting amplifier 27 through a coupling capacitor 26 for removing a DC component. Generally, the optical image of a daytime outdoor object irradiated with the sun has no variation with time and is a DC component and therefore is removed by the coupling capacitor 26. Also, an object under artificial illumination is subjected to modulation by the frequency of the commercially available power source, but is likewise removed because it is a very low frequency. That is, in the present device, it is necessary that the time constant determined by the input impedances of the coupling capacitor 26 and the non-inverting amplifier 27 be the time constant of such a high-pass filter that there is a sufficient gain at the modulated frequency of a projected light beam but the gain is sufficiently low at the frequency of the commercially available power source. The reference numeral 28 designates a wide-band half wave rectifier which makes the photoelectric conversion output of the optical image of an amplified projected light beam component into a direct current. The reference numeral 29 denotes a mirror integration circuit having a time constant, which smoothes the half wave rectification output. The time constant of a time constant circuit 30 must be set to a time sufficiently longer than the inverse number of the modulated frequency of the projected light beam and short enough so that no inconvenience is felt in operating the camera. The photoelectric conversion output of the object image formed by the projected light beam which has been made into a direct current is output to the common bus 23 through a switch 22a, controlled by the shift register 21.

The optical image photoelectric conversion output having the portion contributed to the outside environmental light cut by the discrimination DC-making circuit of the construction as described above is successively written into the memory RAM by the calculating unit CPU. After a sequence of data sampling, the amount of relative displacement (the so-called amount of image deviation) of two images formed by the imaging light beams passed through different pupil areas of the photo-taking lens is calculated by a conventional calculating method, and is converted into a defocus amount. If the converted value is within the in-focus judgment standard, in-focus is judged, and if the converted value is outside said standard, the photo-taking lens is driven on the basis of the calculated defocus information.

Where there are focus detection of the passive type and focus detection of the active type, focus detection of which type would be effected will hereinafter be described with respect to a focus detecting device having, for example, in addition to focus detection of the passive type, focus detection of the active type which does not have means for discriminating between the outside light and the projected light pattern. Heretofore, in such a case, the active type had only an auxiliary role for the passive type. The manner in which the two types are used will now be described with reference to the flow chart of FIG. 16 of the accompanying drawings.

First, at #1, photoelectric charge accumulation by the passive type is effected without the use of the light projection device. This is because it is better to effect focus detection by a system advantageous as much as possible in terms of energy conservation and focus detection of the active type is used auxiliarily. When the photoelectric charge accumulation of the passive type is terminated, at #2, the output of a photoelectric converting element array is introduced into a memory for data in a microcomputer, and the amount of image deviation on the photoelectric converting element array is calculated to thereby find the amount of driving of the photo-taking lens. At this time, the degree of coincidence between the two images, the contrast and the luminance of the images are calculated at a time. Subsequently, at #3, whether this focus detection result is effective is judged from the degree of coincidence between the images, the contrast and the luminance of the images calculated at #2. When it is judged that the focus detection result is good, at #4, in-focus is judged, and depending on the result thereof, lens driving (#5) or in-focus display and release operation, not shown, are effected. When at #3, the focus detection result is not effective, at #6, the light projection device for focus detection is operated to effect the photoelectric charge accumulation of the active type. When the accumulation in the photoelectric converting element array is terminated by the reflection of the projected light, at #7, focus detection calculation is effected, and at #8, the effectiveness is judged. If the focus detection result is not effective, focus detection is impossible and therefore the display of it is effected or search is effected. If the focus detection result is effective, at #4, in-focus is judged and similar control to that during the focus detection of the passive type is effected.

In the aforedescribed previously proposed example, no consideration has been given to the passive type and the active type in spite of there being objects easy to be focus-detected by these two types and objects difficult to be focus-detected by these two types, and in spite of the fact that selection of the two types is an important matter, and the passive type has been chiefly used and the active type has merely played an auxiliary role therefor. Particularly, in the active type wherein the means for discriminating between the projected light beam and the outside light is absent, even in an object situation in which the active type is clearly advantageous, focus detection of the active type is not effected until it is judged that the result by the photoelectric conversion output of the passive type indicates the impossibility of focus detection, and this has led to the disadvantage that the responsiveness of the system is bad when the active type is selected. Further, in the case of the active type which has the means for discriminating between the projected light beam and the outside light, it is often the case with such auxiliary use of the active type that even for an object for which the active type is advantageous, focus detection is effected in the passive type, and this becomes disadvantageous in terms of accuracy and therefore, it has been necessary to select the active type and the passive type by some method or other.

For example, assuming that a dark object for which the passive type is difficult has been focus-detected, the accumulation time at #1 in FIG. 16 is set long. Therefore, at #3, it is judged that the focus detection result is bad, and much time is taken until the accumulation of the active type of #6 is reached, and responsiveness becomes bad.

Also, if the contrast of an object itself is very low in spite of there being a quantity of light to some degree, there may be not only a case where the photoelectric conversion output obtained from the photoelectric conversion element array is such as shown in FIG. 17A of the accompanying drawings, but also a case where said photoelectric conversion output is such as shown in FIG. 17B of the accompanying drawings Such an object is awkward to the focus detection of the passive type, and there is the disadvantage that if as a result of the focus detection of the passive type, the active type is selected after focus detection has become impossible, the responsiveness of the entire focus detecting operation will become bad.

Also, there is a case where even for an object unsuitable for the passive type, as compared with the active type, the focus detection result is judged as being effective at #3 and focus detection worse in accuracy than when focus detection is effected in the active type is effected.

SUMMARY OF THE INVENTION

One aspect of the application is to provide a focus detecting or distance measuring device having accumulation modes of the passive type and the active type, respectively, and wherein the accumulation state during the accumulating operation in one of said types is monitored and when from said accumulation state, it is judged that the accumulation in this mode is improper, the accumulation mode is changed over to the other mode.

Another aspect of the application is to provide, under the above object, a focus detecting or distance measuring device in which the accumulation of light signals is effected by a light signal accumulation type sensor array and said judgment is effected on the basis of the accumulation state of a sensor element exhibiting a maximum accumulation value at a point of time whereat a predetermined time has elapsed after the starting of the accumulation.

A further aspect of the application is to provide, under the above object, a focus detecting or distance measuring device in which the accumulation of said light signals is effected by a light signal accumulation type sensor array and said judgment is effected on the basis of the difference between the accumulation states of sensor elements exhibiting a maximum and a minimum accumulation value at that time.

Other objects of the present invention will become apparent from the following detailed description of some embodiments thereof taken in conjunction with the accompanying drawings.

BRIEF DESCRIPTION OF THE DRAWINGS

FIGS. 4 and 5 are flow charts showing the operation of a control device according to an embodiment of the present invention.

FIG. 9 is a perspective view showing the optical system of a focus detecting device according to a previously proposed device.

FIG. 10 is a perspective view showing an auxiliary light device according to the known device.

FIG. 11 is a graph showing the spectral transmittances of an infrared cut filter and a visible cut filter.

FIG. 12 is a graph showing the spectral strength distribution of a light emitting diode.

FIG. 13 shows image signals.

FIG. 14 is a circuit diagram showing the previously proposed focus detecting device and light projection device for focus detection.

FIGS. 22 and 23 are flow charts showing the operation of a control device according to the embodiment of FIG. 18.

FIG. 26 is a flow chart showing the operation of a control device according to the embodiment of FIG. 24.

DESCRIPTION OF THE PREFERRED EMBODIMENTS

Figure 1:
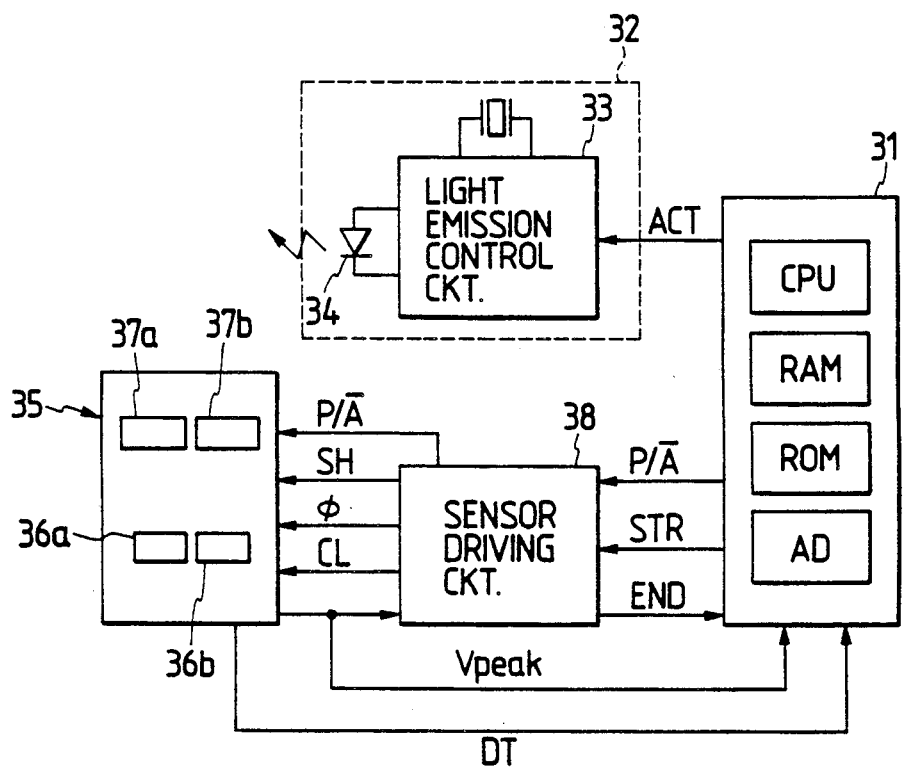
FIG. 1 is a block diagram showing an embodiment of the present invention with a light projection device for focus detection.
Figure 2:
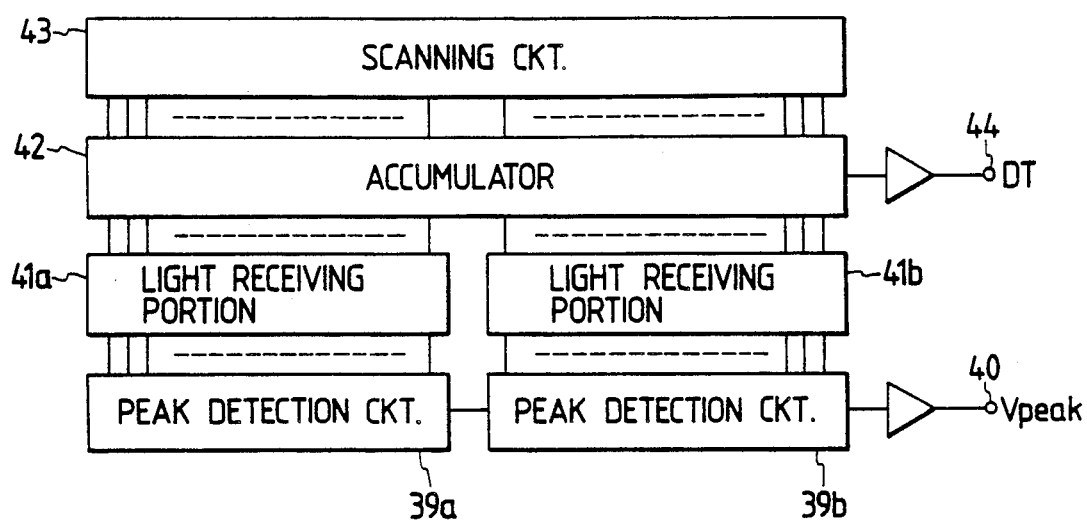
FIG. 2 is a block diagram showing the internal construction of photoelectric converting element arrays of the passive type in an embodiment of the present invention.

FIG. 1 shows the general construction of an embodiment of the present invention with a light projection device for focus detection, and FIG. 2 shows the internal construction of a photoelectric converting element array of the passive type in an embodiment of the present invention.

In FIG. 1, the reference numeral 31 designates a control device which is, for example, a 1-chip microcomputer having therein a calculating unit CPU, an analog/digital converter AD, a memory RAM for data, a memory ROM for programs, and input and output ports. An AF control program and parameters are stored in the memory ROM. The reference numeral 32 denotes a light projection device which has a light emission control circuit 33 and a projection light source 34 such as a light emitting diode. The light emission control circuit 33 causes the projection light source 34 to be modulated and emit a light as long as a control signal Act from the control device 31 is at a high level. The reference numeral 35 designates a sensor device having photoelectric converting element arrays 36a, 36b, 37a and 37b similar to photoelectric converting element arrays 7a, 7b, 8a and 8b shown in FIG. 9. The photoelectric converting element arrays 36a and 36b are selected during a first focus detection mode in which the projection light beam from the light projection device 32 is not projected, and cause focus detection of the passive type to be effected by the outputs thereof. The photoelectric converting element arrays 37a and 37b are selected during a second focus detection mode in which the projection light beam from the light projection device 32 is projected, and cause focus detection of the active type to be effected by the outputs thereof. The reference numeral 38 denotes a sensor driving circuit which receives from the control device 31 an accumulation starting signal STR and a selection signal P/$\overline{A}$ for selecting the photoelectric converting element arrays 36a, 36b, or 37a, 37b to be used, and starts the photoelectric charge accumulation of the selected photoelectric converting element arrays. The sensor driving circuit 38 controls the sensor device 35 by the use of the selection signal P/$\overline{A}$, a read-out starting signal SH, a driving clock signal $\phi$ and a clear signal CL. The sensor device 35 always outputs a peak signal Vpeak (the maximum value of the accumulated charge) as a signal for controlling the photoelectric charge accumulation, and the sensor driving circuit 38 controls the accumulation time and the gain of the output. When the accumulation is completed, the sensor driving circuit 38 outputs an accumulation end signal END to the control device 31, and the control device 31 receives as an input a data signal DT from the sensor device 35.

FIG. 2 is a block diagram showing the internal construction of the photoelectric converting element arrays 36a and 36b of the passive type. The reference characters 39a and 39b designate peak detection circuits which output the maximum one of all picture elements as a peak signal Vpeak from a peak signal output terminal 40. The reference characters 41a and 41b denote light receiving portions, and the reference numeral 42 designates an accumulator having an accumulation capacity and effecting signal processing. The accumulator 42 accumulates therein photoelectric conversion signals photoelectrically converted by a light being applied to the light receiving portions 41a and 41b. The charges accumulated in the accumulator 42 are subjected to switching by a scanning circuit 43 and are successively output to a data signal output terminal 44.

Figure 3:
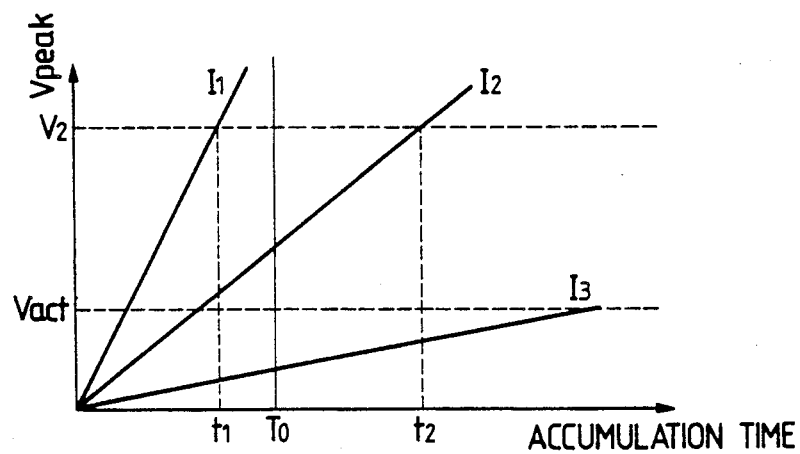
FIG. 3 is a characteristic graph showing a relation between the accumulation time and the peak signal of a photoelectric converting element array according to an embodiment of the present invention.

FIG. 3 shows the relation between the peak signal Vpeak and the accumulation time. $I_1$-$I_3$ are peak value curves showing the differences in the intensity of light, and accumulation is effected until the charge reaches a predetermined voltage $V_2$.

By the value of the peak signal Vpeak at the reference time $T_o$ after the starting of the accumulation, the operation of the control device 31 becomes as follows.

(I) In the case of $I_1$, at the reference time $T_o$, the accumulation has already been terminated by a time $t_1$ before that. Therefore, focus detection calculation is effected as in the prior art.

(II) In the case of $I_2$, $V_2$ > Vpeak > Vact (change-over threshold value) at the reference time $T_o$. Again at this time, the accumulation is effected up to the predetermined value $V_2$ and focus detection calculation is effected as in the prior art.

(III) In the case of $I_3$, the peak signal Vpeak at the reference time $T_o$ has not reached the change-over threshold value Vact. It is in such a case that improvement is made in the present embodiment, and this is so in the case of a dark object for which focus detection of the passive type is difficult. In the prior art, such an object image is accumulated for a long time and focus detection calculation is effected, whereafter a shift is made to the active type. However, in the present embodiment, at this point of time, a shift is made to the active type.

Figure 4:
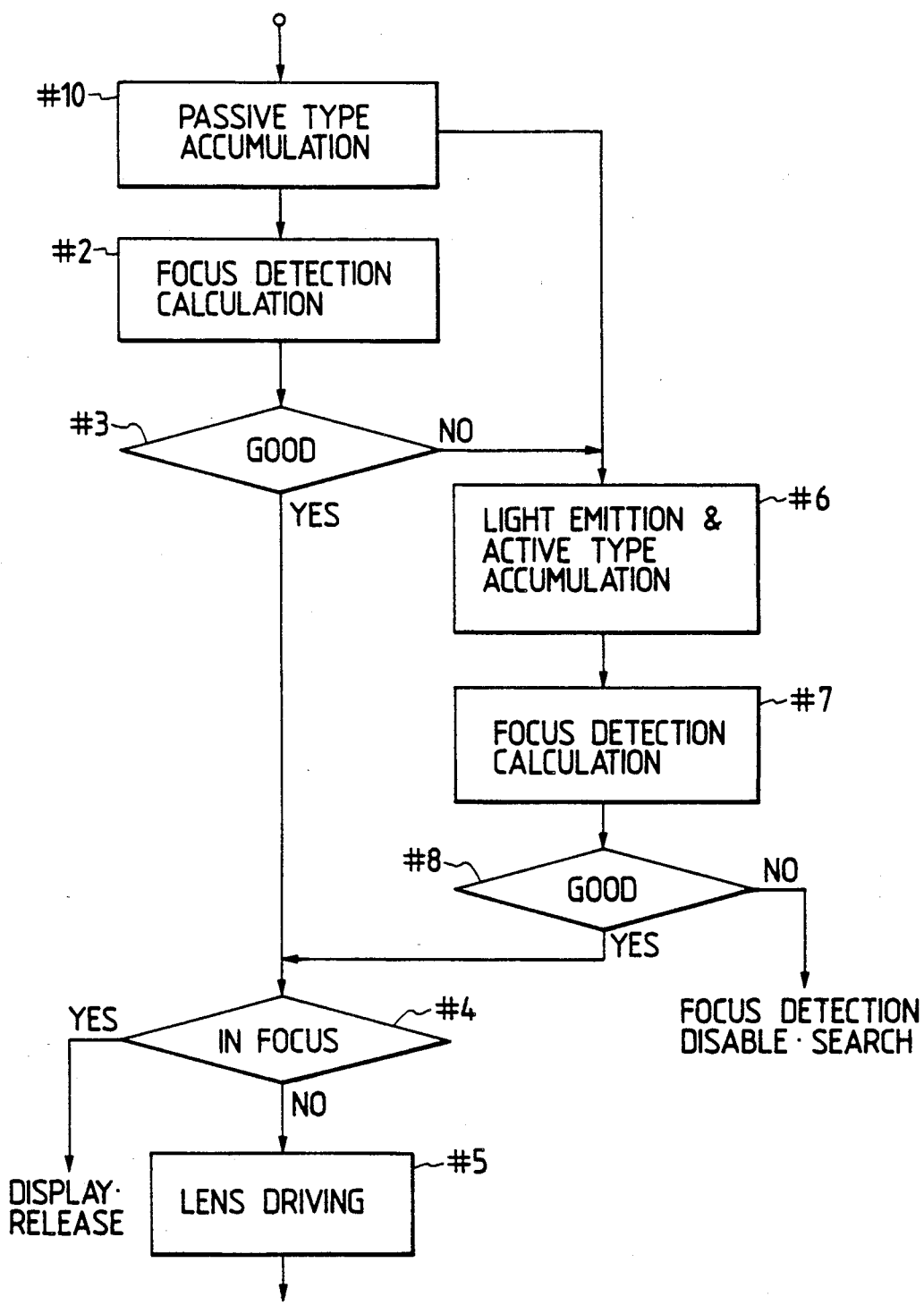
Figure 16:
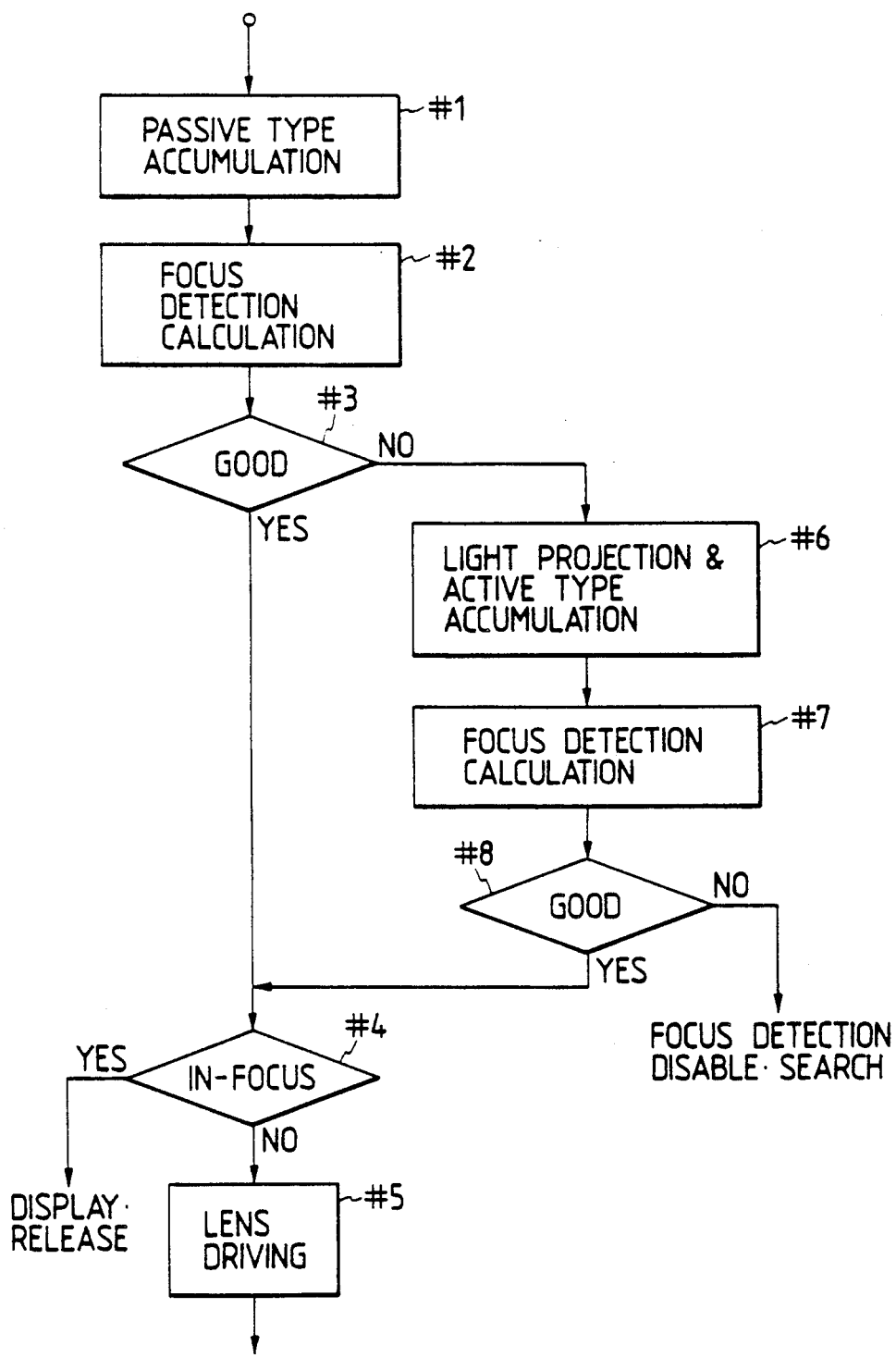
FIG. 16 is a flow chart showing the change-over of the conventional passive type and active type.

FIG. 4 is a sequence flow chart of the present embodiment, and shows the operation of the control device 31. At #10, the photoelectric converting element arrays 36a and 36b are selected and photoelectric charge accumulation of the passive type is effected. Here, a feature is that accumulation is effected while the peak signal Vpeak of the photoelectric converting element arrays 36a and 36b is monitored and if necessary, a jump is made to the focus detection of the active type before the accumulation is completed. The other steps #2-#8 are the same as those described with reference to FIG. 16.

The portion #10 will now be described in detail with reference to FIG. 5A. At #101, the selection signal P/$\overline{A}$ of a high level is output and the photoelectric converting element arrays 36a and 36b of the passive type are selected. At #102, the accumulation starting signal STR is output to the sensor driving circuit 38, which causes the sensor device 35 to start accumulation. At #103, interruption is allowed. That is, when the accumulation end signal END is received from the sensor driving circuit 38, the normal operation is interrupted and the program from #107 is executed. For example, in the case of $I_1$, the accumulation is completed while the lapse of the reference time $T_o$ is waited for, and data reading (#108) and focus detection calculation (#2) are effected.

104 is a waiting routine in which waiting takes place from the starting of the accumulation until the preset reference time $T_o$. At #105, the peak signal Vpeak is read from the sensor device 35, and at #106, the peak signal Vpeak is compared with the preset change-over threshold value Vact. When Vpeak<Vact, at #109, accumulation end interruption is prohibited, and at #6, light projection by the light projection device 32 and the active type accumulation are executed. When Vpeak≧Vact, the accumulation end is waited for, and after the accumulation is completed, the accumulation end interruption is prohibited (#107), and data is read out (#108).

The active type accumulation of #6 will now be described in detail with reference to FIG. 5B. At #601, the use of the photoelectric converting element arrays 37a and 37b of the active type is communicated to the sensor driving circuit 38 by the use of the selection signal P/$\overline{A}$. At #602, the control signal Act is sent to the light emission control circuit 33 of the light projection device 32. The light emission control circuit 33 causes the projection light source 34 to emit a light by predetermined modulation as long as the control signal Act is communicated. At #603, the accumulation in the photoelectric converting element arrays 37a and 37b is started, and at #604, interruption is allowed, and the completion of the accumulation is waited for. When the accumulation is completed, the interruption is prohibited (#605), and the light emission is stopped (#606). Data is then read (#607), and a shift is made to #7, where focus detection calculation is effected.

Figure 6:
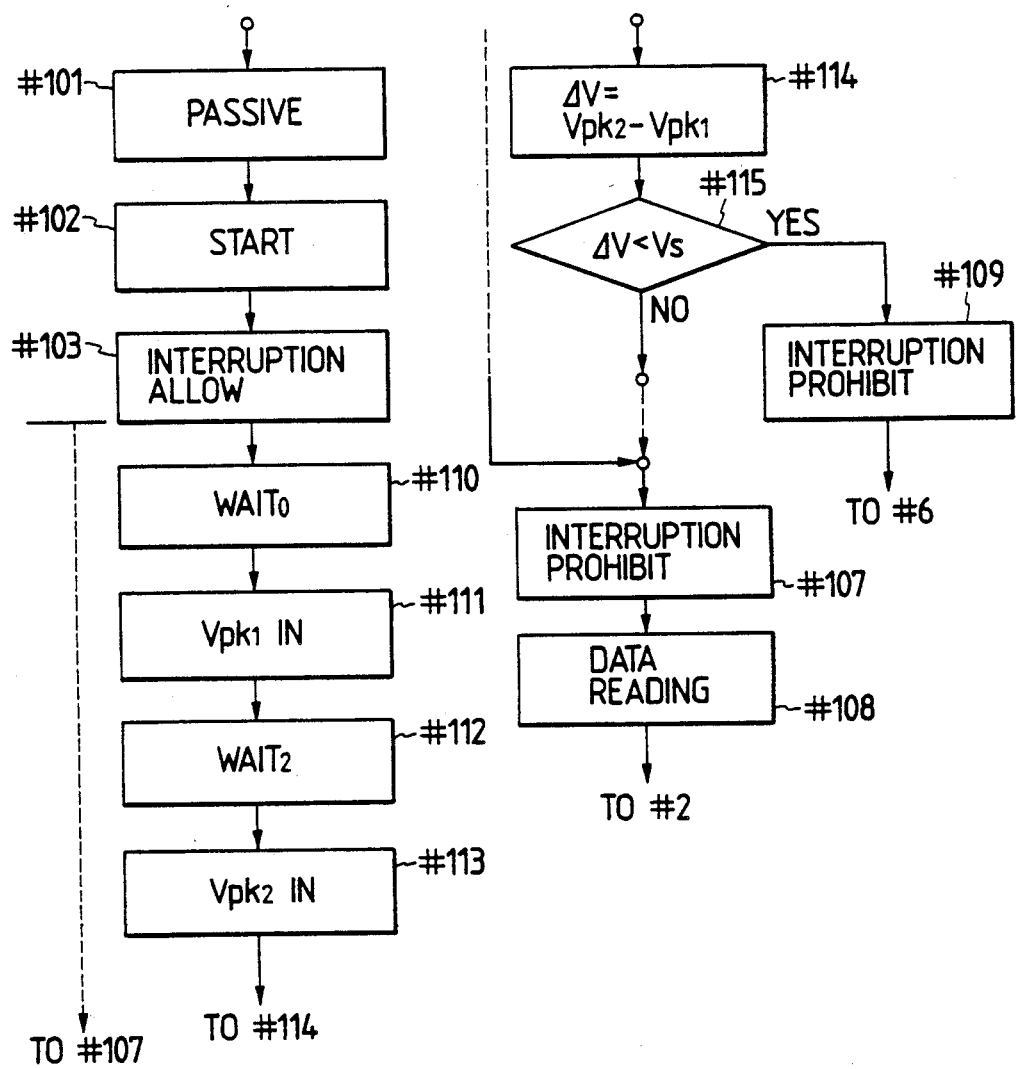
FIG. 6 is a flow chart showing another example of the operation of the control device.

FIG. 6 shows another flow of the passive type accumulation at step #10.

101-#103 are similar to those in FIG. 5A and therefore need not be described. At #110, waiting takes place from the starting of the accumulation until a first reference time $T_{01}$ shown in FIG. 7. This is for preventing any misjudgment which may occur during that portion of a predetermined time from the starting of the accumulation which lacks the linearity of the quantity of light and time. At #111, the value $Vpk_1$ of the peak signal Vpeak at the first reference time $T_{01}$ is introduced. Subsequently, at #112, wating takes place for a predetermined time $\Delta T$. If the quantity of light is great, in the case of $I_1$, the accumulation is completed in the meantime. At #113, the value $Vpk_2$ of the peak signal Vpeak at a second reference time $T_{02}$ is introduced, and its amount of variation $\Delta V = Vpk_2 - Vpk_1$ is calculated (#114). If this value is smaller than a predetermined value Vs, a jump is made to #109, where accumulation end interruption is prohibited, and a shift is made to #6, where the active type accumulation is effected. If at #115, the amount of variation $\Delta V$ is greater than the predetermined value Vs, the completion of the accumulation is waited for, and after the completion of the accumulation, at #107, the accumulation end interruption is prohibited, whereafter control is effected in the same manner as the case of FIG. 5A.

Figure 7:
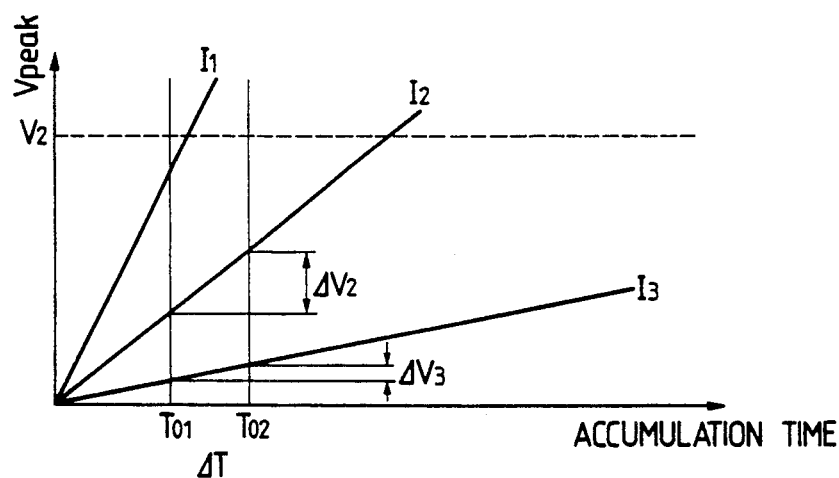
FIG. 7 is a characteristic graph showing another relation between the accumulation time and the peak signal of the photoelectric conversion element array.

In the flow of FIG. 6, the reference times $T_{01}$ and $T_{02}$ shown in FIG. 7 are set to be smaller than the reference time $T_0$ shown in FIG. 3, whereby a shift can be made to the active type at an earlier point of time as compared with the flow of FIG. 5A.

Figure 8:
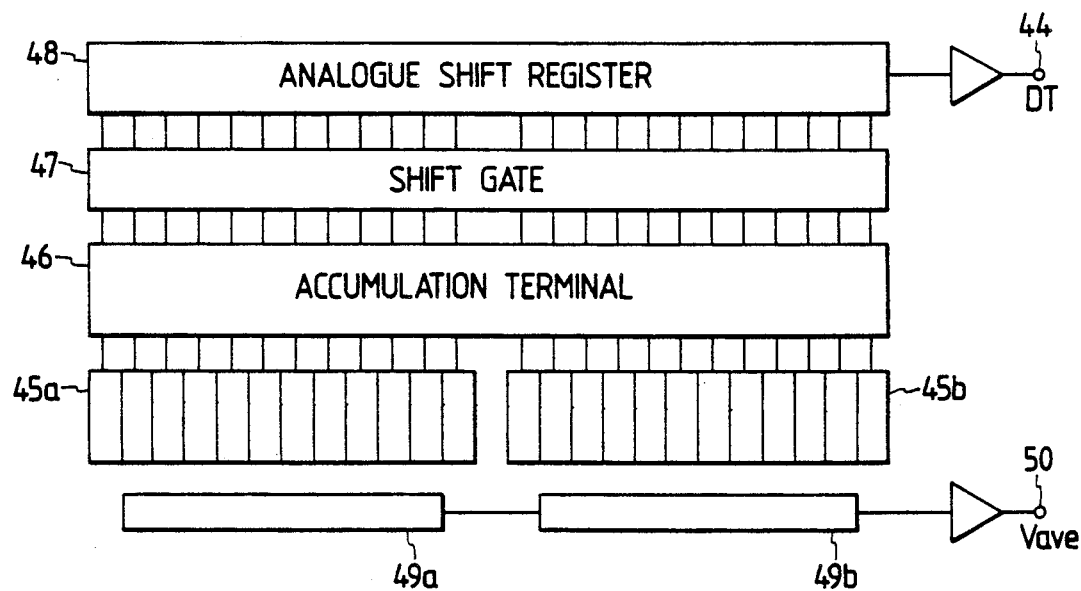
FIG. 8 is a block diagram showing the interval construction of photoelectric converting element arrays of the passive type in another embodiment of the present invention.
Figure 15:
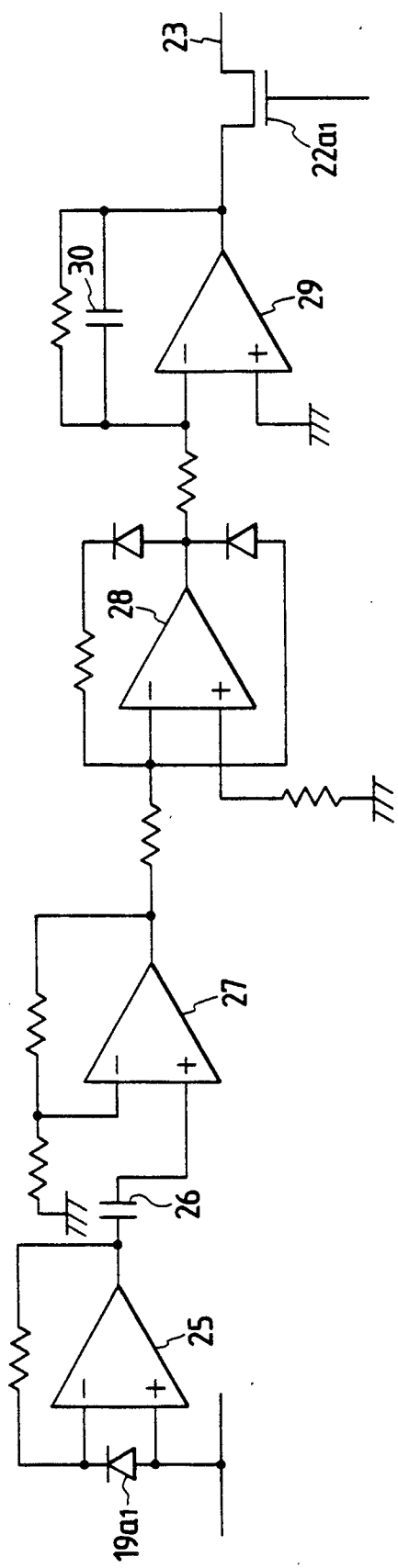
FIG. 15 is a circuit diagram showing an example of the discrimination DC-conversion circuit of the device shown in FIG. 14.

FIG. 8 shows an embodiment using a photoelectric converting element array of the type which cannot normally obtain the peak signal Vpeak of each picture element. The reference characters 45a and 45b designate light receiving portions each comprising, for example, a plurality of photodiodes. Charges photoelectrically converted by the light receiving portions 45a and 45b are accumulated in an accumulation terminal 46. These charges are transferred to an analog shift register 48 which provides a transfer portion through a shift gate 47. The charges are successively transferred from the analog shift register 48, and a data signal DT is obtained from a data signal output terminal 44. The reference characters 49a and 49b denote accumulation monitoring sensors provided separately to control the accumulation in the accumulation terminal 46. The accumulation monitoring sensors 49a and 49b output from an average value signal output terminal 50 an average value signal Vave proportional to the average value of lights entering the light receiving portions 45a and 45b. The average value signal Vave can be handled in the same manner as the aforedescribed peak value Vpeak to thereby select the passive type and the active type. Further, of course, the control method as shown in the flow of FIG. 6 is also possible.

The shown embodiment has been described with respect to a device in which discrete photoelectric converting element arrays are used for the passive type and the active type, respectively, and outside light removing means is provided in the photoelectric converting element array for the active type, whereas these need not always be provided discretely from each other. However in a case where accumulation is effected in the same photoelectric converting element array during the nonprojection of light and during the projection of light, it is of course possible to effect the conventional auxiliary light use judgment by the technique of the present invention.

Figure 18:
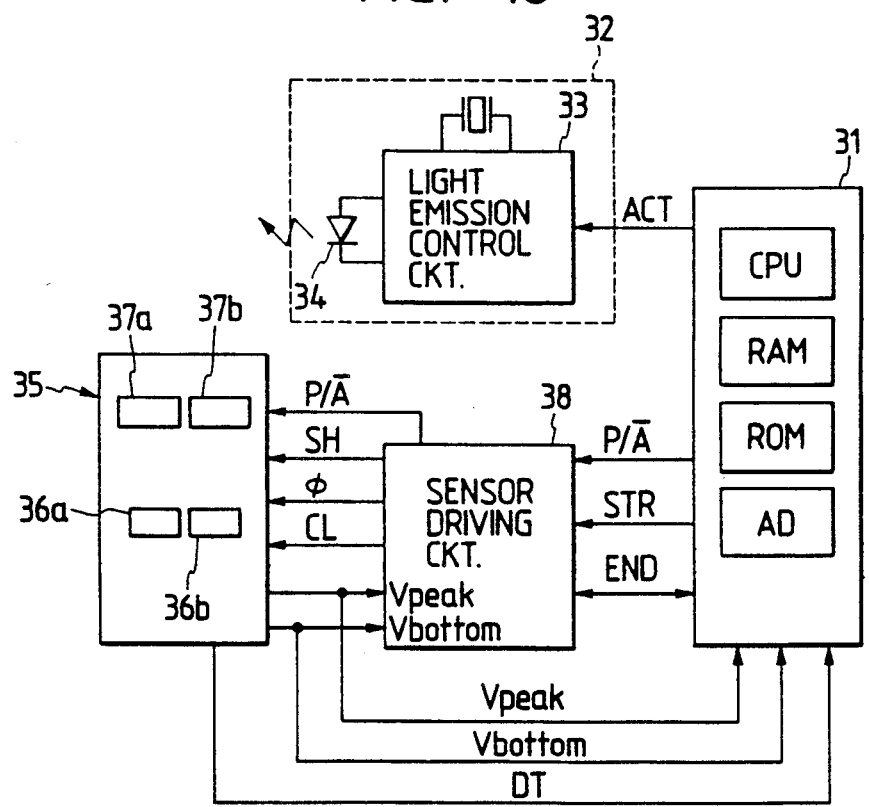
FIG. 18 is a block diagram showing another embodiment with a light projection device for focus detection.
Figure 19:
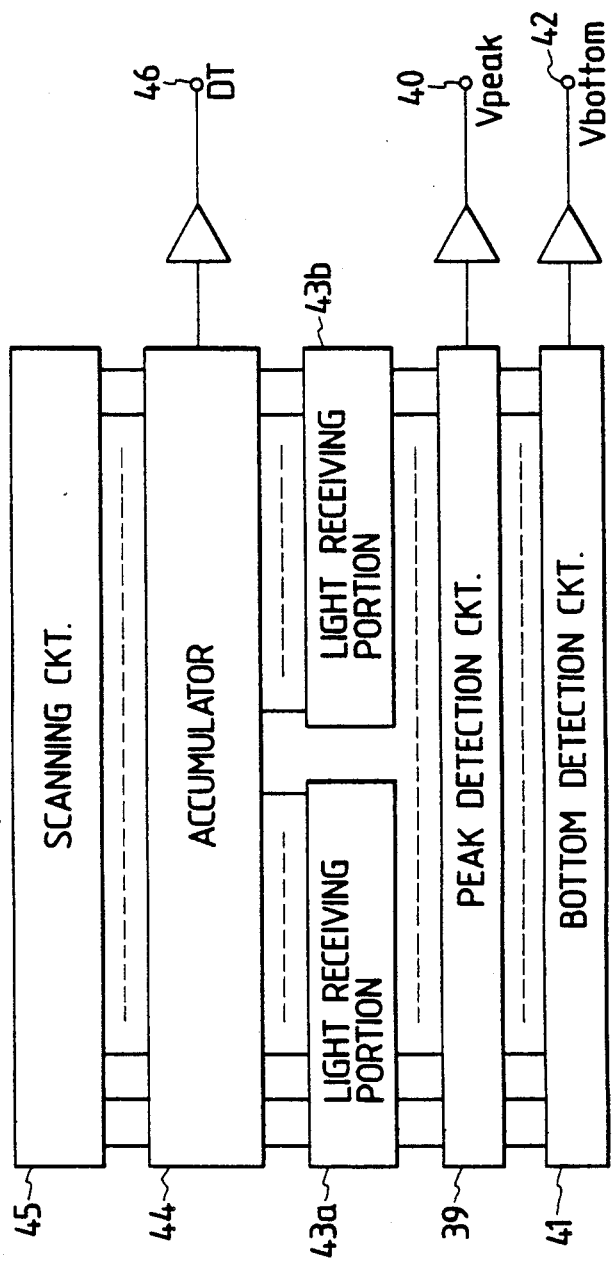
FIG. 19 is a block diagram showing the internal construction of photoelectric converting element arrays of the passive type in the embodiment of FIG. 18.

FIG. 18 shows the general construction of another embodiment of the present invention with a light projection device for focus detection, and FIG. 19 shows the internal construction of photoelectric converting element arrays of the passive type in the embodiment of FIG. 18.

In the embodiment of FIG. 18, portions similar to those in the embodiment of FIG. 1 are given similar reference characters.

The embodiment of FIG. 18 differs from the embodiment of FIG. 1 only in that the sensor device 35 always outputs a bottom signal V bottom indicative of the minimum value of the accumulated charge, besides a peak signal V peak indicative of the maximum value of the accumulated charge, in order to control the photoelectric charge accumulation, and that the sensor driving circuit 38 controls the accumulation time and the gain of the output.

FIG. 19 is a block diagram showing the internal construction of photoelectric converting element arrays 36a and 36b of the passive type. The reference numeral 39 designates a peak detection circuit which outputs the greatest one of all picture elements as a peak signal V peak from a peak signal output terminal 40, and the reference numeral 41 denotes a bottom detection circuit which outputs the smallest one of all picture elements as a bottom signal V bottom from a bottom signal output terminal 42. The reference characters 43a and 43b designate light receiving portions, and the reference numeral 44 denotes an accumulator having an accumulation capacity and effecting signal processing. The accumulator 44 accumulates therein photoelectric conversion signals photoelectrically converted by a light being applied to the light receiving portions 43a and 43b. Charges accumulated in the accumulator 44 are subjected to switching by a scanning circuit 45 and are successively output to a data signal output terminal 46.

Figure 20A:
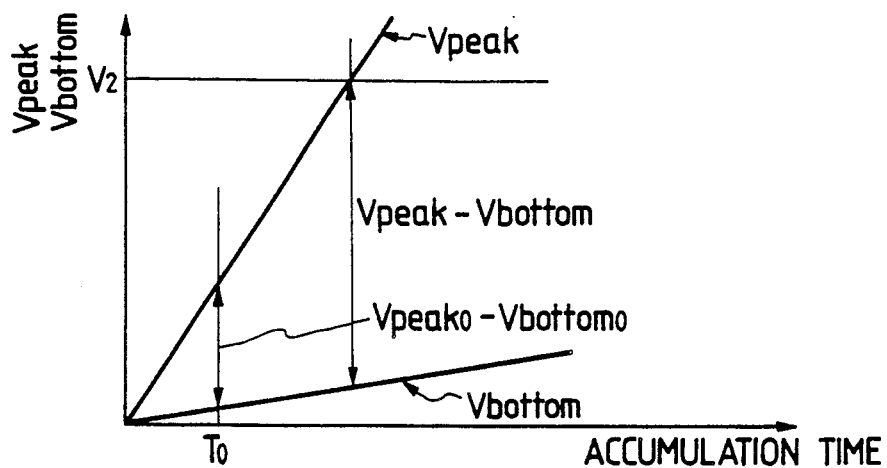
FIGS. 20A and 20B are characteristic graphs showing the relation between the accumulation time and the peak signal and the bottom signal of the photoelectric converting element array according to the embodiment of FIG. 18.
Figure 20B:
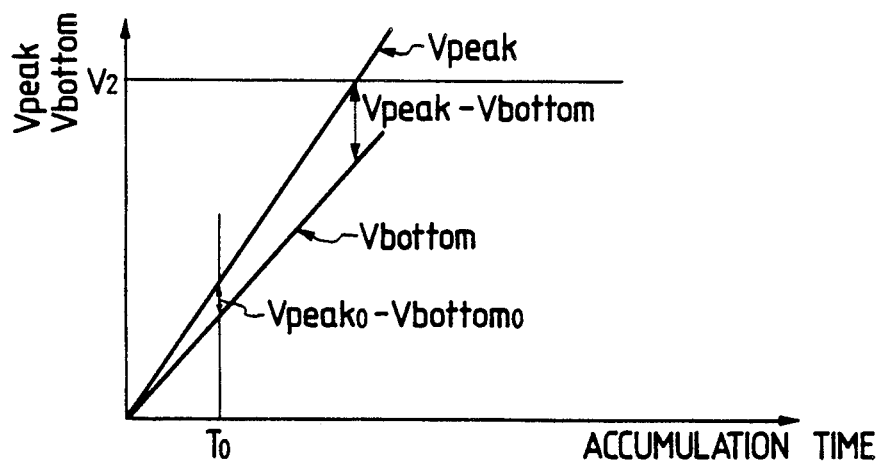

FIG. 20 shows the relation between the peak signal Vpeak and the bottom signal Vbottom and the accumulation time. FIGS. 20A and 20B refer to cases where the maximum values of the intensities of lights are substantially the same and the contrasts of the lights differ from each other, and correspond to the cases of FIGS. 17A and 17B, respectively. The accumulation is effected until the peak signal Vpeak reaches a predetermined voltage $V_2$.

After the accumulation is started, whether focus detection should be effected in the passive type or a shift should be made to the active type is determined by the values of the peak signal Vpeak and the bottom signal Vbottom at a reference time $T_0$.

Figure 17A:
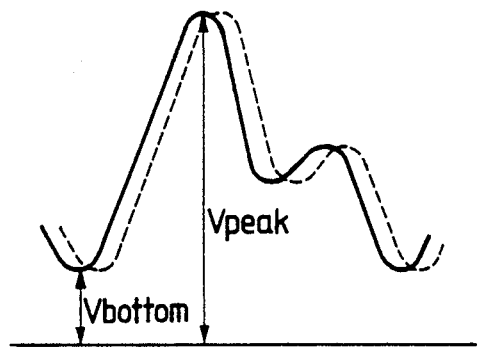
FIG. 17 shows variations in the photoelectric conversion output by contrast.

If the photoelectrically converted output is such as shown in FIG. 17A, the relation between the accumulation time and the output is such that as shown in FIG. 20A, $Vpeak_0 - Vbottom_0$ is sufficiently great at the reference time $T_0$. In this case, the object is bright and the contrast thereof is great and therefore, focus detection of the passive type is continued.

Figure 17B:
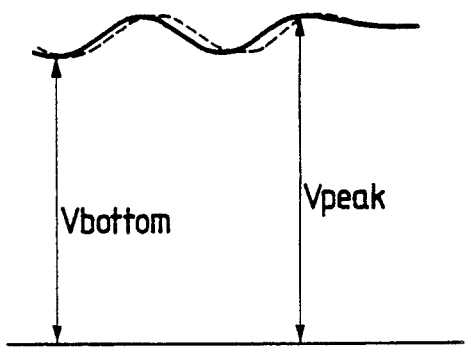

Next, if the photoelectrically converted output is such as shown in FIG. 17B, the relation between the accumulation time and the output shows that as shown in FIG. 20B, $Vpeak_0 - Vbottom_0$ is not sufficiently great at the reference time $T_0$ and the object is bright to some extent but the contrast thereof is small. In such a case, it is better to effect focus detection of the active type than to effect focus detection of the passive type and therefore, focus detection of the passive type is interrupted and focus detection of the active type is begun.

Figure 21A:
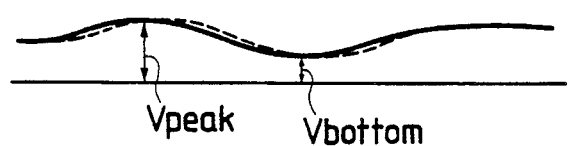
FIG. 21A shows the photoelectric conversion output in the case of low luminance and low contrast.
Figure 21B:
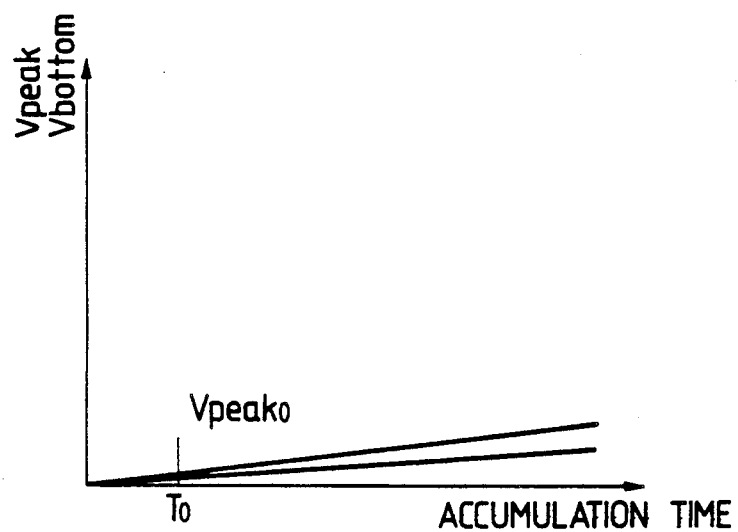
FIG. 21B is a characteristic graph showing the relation between the accumulation time and the peak signal and the bottom signal in the same case.

If the object is dark and the contrast thereof is low, the photoelectrically converted output becomes such as shown in FIG. 21A and the relation between the accumulation time and the output becomes such as shown in FIG. 21B. At the reference time $T_0$, neither of the value of $Vpeak_0$ nor the value of $Vpeak_0 - Vbottom_0$ is great and therefore, at this point of time, a shift is made to the active type.

Figure 22:
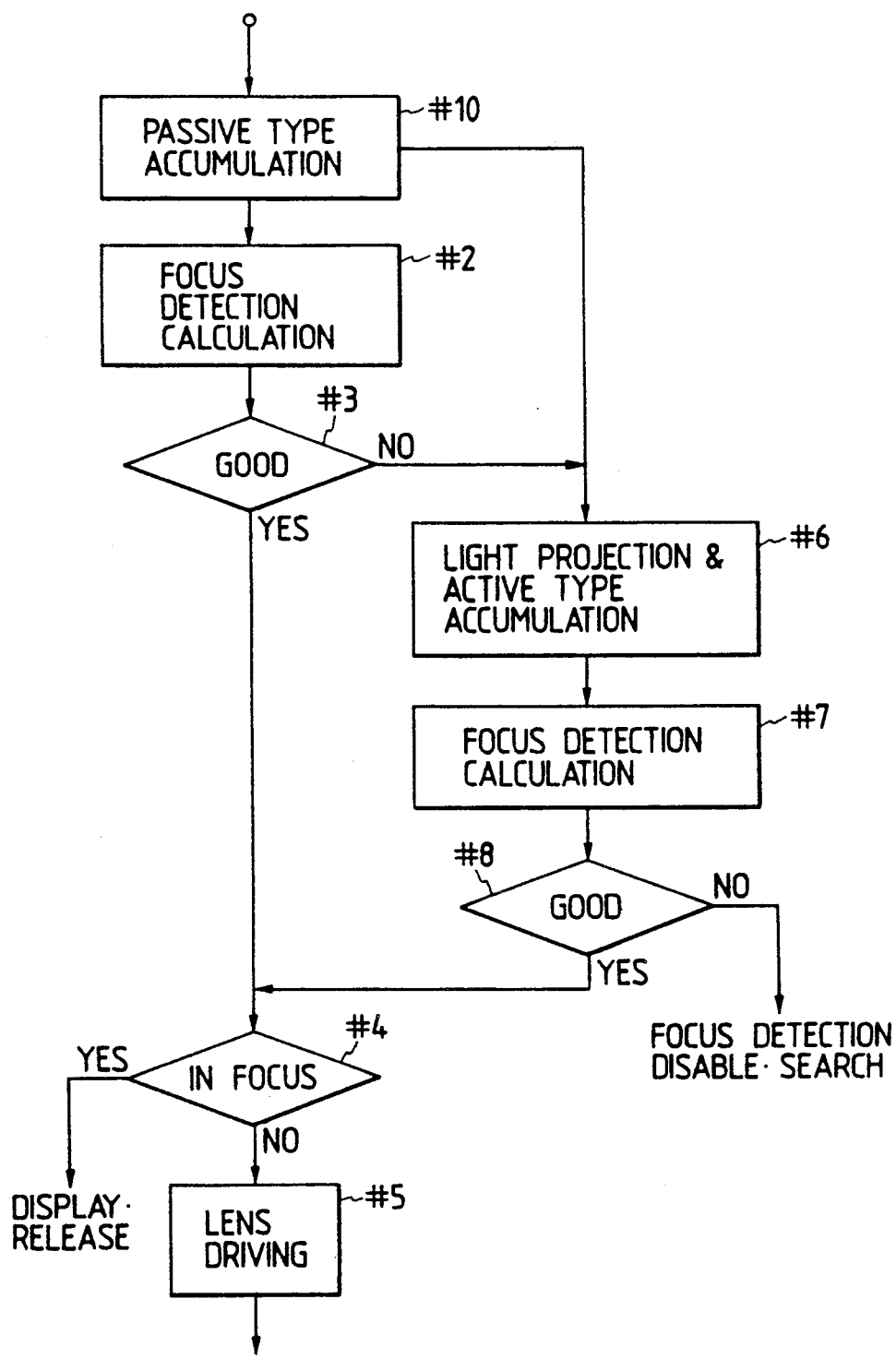

FIG. 22 is a sequence flow chart of the FIG. 18 embodiment, and shows the operation of the control device 31. At #10, the photoelectric converting element arrays 36a, 36b are selected to thereby effect photoelectric charge accumulation of the passive type. Here, it is a feature that the accumulation is effected while the peak signal Vpeak and bottom signal Vbottom of the photoelectric converting element arrays 36a and 36b are always introduced and if necessary, a jump is made to focus detection of the active type before the accumulation is completed. The other steps #2–#8 are the same as those described with reference to FIG. 4.

Step #10 will hereinafter be described in detail with reference to FIG. 23A. At #101, a selection signal P/$\overline{A}$ of a high level is output and the photoelectric converting element arrays 36a and 36b of the passive type are selected. At #102, an accumulation starting signal STQ is output to the sensor driving circuit 38, which thus causes the sensor device 35 to start accumulation. At #103, the accumulation end interruption is allowed. That is, the setting is made such that when an accumulation end signal END is received from the sensor driving circuit 38, the normal operation is interrupted and the program of steps #109 and so on is executed.

Step #104 is a waiting routine in which waiting takes place from the starting of the accumulation until the preset reference time $T_0$. This is for preventing misjudgment from being formed because immediately after the starting of the accumulation, there is no linearity in the relation between the quantities of light entering the photoelectric converting element arrays 36a and 36b and the charges and no clear difference appears between the peak signal Vpeak and the bottom signal Vbottom. At #105, the peak signal Vpeak is read from the sensor device 35 and is stored in the memory RAM. Subsequently, at #106, the bottom signal Vbottom is read, and at #107, the difference Vd between the peak signal Vpeak and the bottom signal Vbottom is calculated. At #108, the difference Vd = Vpeak − Vbottom is compared with a predetermined change-over threshold value Vact, and when Vd < Vact, at #111, the accumulation end interruption is prohibited and a shift is made to #6, where the light projection by the light projection device 32 and the active type accumulation are executed. When Vd ≧ Vact, the completion of the accumulation is waited for and after the completion of the accumulation, the accumulation end interruption is prohibited (#109) and data is read out (#110).

The active type accumulation of #6 will now be described in detail with reference to FIG. 23B. At #601, the use of the photoelectric converting element arrays 37a and 37b of the active type is communicated to the sensor driving circuit 38 by the use of the selection signal P/$\overline{A}$. At #602, a control signal Act is sent to the light emission control circuit 33 of the light projection device 32. The light emission control circuit 33 causes the projection light source 34 to emit a light by predetermined modulation as long as the control signal Act is communicated. At #603, the accumulation in the electric converting element arrays 37a and 37b is started, and at #604, the interruption is allowed, and the completion of the accumulation is waited for. When the accumulation is completed, the interruption is prohibited (#605) and the light emission is stopped (#606). The data is then read (#607), and shift is made to #7, where focus detection calculation is effected.

Figure 24:
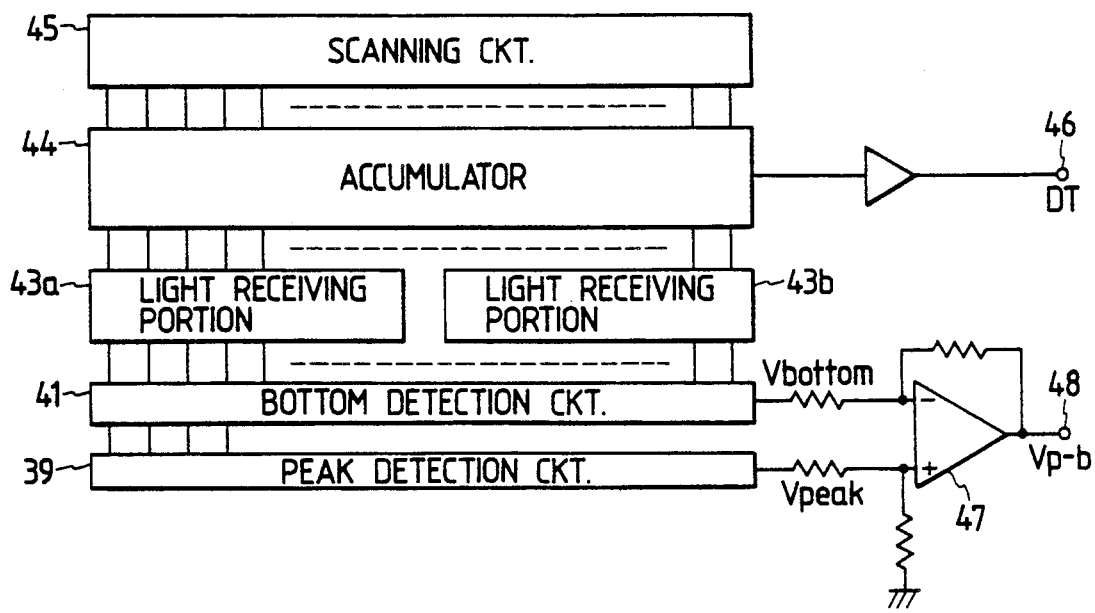
FIG. 24 is a block diagram showing the internal construction of photoelectric converting element arrays of another passive type in the embodiment of FIG. 18.

FIG. 24 is a block diagram of photoelectric converting element arrays of another passive type in the embodiment of FIG. 18. The reference numeral 39 designates a peak detection circuit which outputs the greatest one of all picture elements as a peak signal Vpeak, and the reference numeral 41 denotes a bottom detection circuit which outputs the smallest one of all picture elements as a bottom signal Vbottom. The respective outputs are input to the non-inverting input terminal and the inverting input terminal, respectively, of a differential amplifier circuit 47. The difference $V_{p-b}$ between Vpeak and Vbottom is output from the differential amplifier circuit 47 through a differential output terminal 48. Light receiving portions 43a, 43b, an accumulator 44 and a scanning circuit 45 which are the other portions are the same as those shown in FIG. 19.

Figure 25:
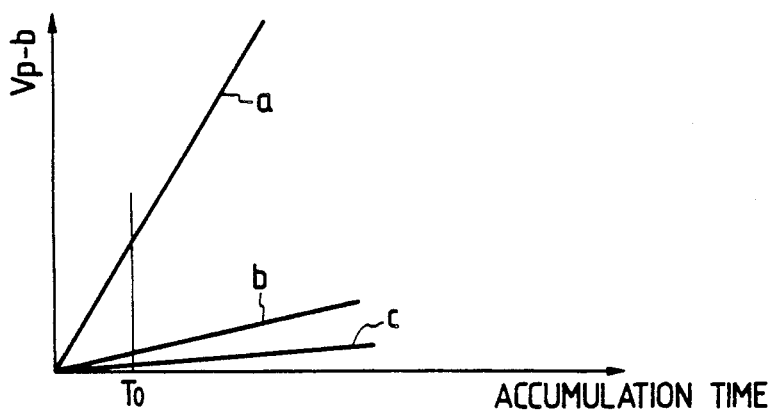
FIG. 25 is a characteristic graph showing the accumulation time and the differential output of the photoelectric converting element array according to the embodiment of FIG. 24.

FIG. 25 shows the relation between the differential output $V_{p-b}$ and the accumulation time. Curves a and b show the cases where the maximum value outputs (Vpeak) are the same and the contrasts differ from each other, and correspond to the cases of FIGS. 17A and 17B, respectively. In the curve a, the minimum value output (Vbottom) is small and the differential output $V_{p-b}$ is great. In the curve b, the minimum value is great and therefore the differential output $V_{p-b}$ becomes small. Further, in the case of the object of FIG. 21A, both the maximum value output (Vpeak) and the minimum value output (Vbottom) are small and therefore, the differential output $V_{p-b}$ becomes small as shown by C in FIG. 25.

For an object of low contrast and low luminance for which the passive type is difficult, whether a shift should be made to the active type is judged by the utilization of the fact that the differential output $V_{p-b}$ becomes small. This will hereinafter be described with reference to the flow chart of FIG. 26. FIG. 26 shows only the portions corresponding to FIG. 23A, and the other portions are the same as FIGS. 22 and 23B.

Steps #101–104 of FIG. 26 are similar to FIG. 23A. (At #101, the passive type accumulation is output, at #102, the accumulation is started, at #103, the accumulation end interruption is allowed, and at #104, stability is waited for.) When the waiting for stability is terminated, the differential output $V_{p-b}$ is input at #120. In FIG. 24, the differential output $V_{p-b}$ can be directly input by the differential amplifier circuit 47, and this leads to the advantage that as compared with a case where data is introduced twice in the soft fashion, there is no time lag between the peak signal Vpeak and the bottom signal Vbottom. At #121, the differential output $V_{p-b}$ is compared with a change-over threshold value Vact, and when Vp−b<Vact, a shift is made to the active type, and when Vp−b≧Vact, accumulation is effected with the passive type continued, and the completion of the accumulation is waited for and focus detection is effected with the passive type.

We claim:

1. A focus detecting device or a distance detecting device having (1) a first mode in which light from an object is accumulated in a light accumulation type receiving portion without light from a light source being projected onto the object and focus detection or distance calculation is effected on the basis of the accumulated output of said light receiving portion, and (2) a second mode in which by a light from a light source is projected onto the object, the light from the object is accumulated in said light receiving portion and focus detection or distance calculation is effected on the basis of the accumulated output of said light receiving portion, said device including:
   (a) an accumulation control circuit for controlling said accumulation operation performed by said light-receiving portion;
   (b) a processing circuit for performing the focus detection or distance calculation on the basis of an accumulated output accumulated by said light receiving portion after controlling of the accumulation operation by said control circuit; and
   (c) a change-over circuit for automatically changing over between said first and second modes on the basis of the accumulation state during the accumulation operation before the control of the accumulation operation by said accumulation control circuit is terminated.

2. A device according to claim 1, wherein said change-over circuit change over the mode in conformity with the accumulation state after the lapse of a predetermined time from the starting of the accumulation of said light.

3. A device according to claim 1, further comprising monitoring means for monitoring the accumulation state in said first mode, and wherein said change-over circuit changes from the first mode to the second mode in accordance with the monitored accumulation state.

4. A device according to claim 1, wherein said change-over circuit changes over the mode in conformity with a difference between the accumulation state at a point of time whereat a first predetermined time has elapsed from the starting of the accumulation operation and the accumulation state at a point of time whereat a second predetermined time differing from said first predetermined time has elapsed.

5. A device according to claim 3, wherein said light receiving portion has a first and a second light receiving portion for accumulating the light from the object, said focus detection or said distance calculation is accomplished on the basis of the light receiving portion output accumulated in said first light receiving portion, and monitoring of the accumulation state of the light is accomplished by said monitoring means by the use of the light receiving portion output accumulated in said second light receiving portion.

6. A device according to claim 1, wherein said light receiving portion has a light receiving portion for said first mode and a light receiving portion for said second mode.

7. A device according to claim 1, further comprising monitoring means for monitoring the accumulation state of the light receiving portion, said change-over circuit changing the modes in accordance with the monitored accumulation state, and wherein the light receiving portion has a plurality of photoelectric converting elements, the light entering each of said elements is accumulated in each of said elements, and a signal conforming to the accumulation state in one of said elements which exhibits the greatest accumulation value of the accumulated signals of said elements is monitored by said monitoring means.

8. A device according to claim 7, wherein said change-over circuit changes over the mode when the signal conforming to the accumulation state monitored by said monitoring means is below a predetermined value.

9. A device according to claim 1, further comprising a detection circuit for detecting the accumulation speed of the accumulation operation, and wherein said change-over circuit changes over the mode when said accumulation speed is lower than a predetermined speed.

10. A focus detecting device or a distance detecting device having (1) a first mode in which light from an object is accumulated in a light accumulation type receiving portion without light from a light source being projected onto the object and focus detection or distance calculation is effected on the basis of the accumulated output of said light receiving portion, and (2) a second mode in which by a light from a light source being projected onto the object, the light from the object is accumulated in said light receiving portion and focus detection or distance calculation is effected on the basis of the accumulated output of said light receiving portion, said device including:

(a) a judgment circuit for judging whether the processing in one of said modes is suitable during the accumulating operation in said light receiving portion in said one mode for the light from the object; and (b) a change-over circuit for automatically changing over the mode to the other mode when said processing is judged as being unsuitable by said judgement circuit.

11. A focus detecting device or a distance detecting device having (1) a first mode in which light from an object is accumulated in a light receiving portion without light from a light source being projected onto the object and focus detection or distance calculation is effected on the basis of the accumulated output of said light receiving portion, and (2) a second mode in which by light from a light source being projected onto the object, the light from the object is accumulated in said light receiving portion and focus detection or distance calculation is effected on the basis of the accumulated output of said light receiving portion, said light receiving portion comprising an accumulation type sensor having a plurality of photoelectric converting elements, each element of said sensor exhibiting an accumulation state conforming to a respective light receiving state, said device comprising:

(a) monitoring means for detecting the accumulation state in one of the elements of said sensor which exhibits the maximum accumulated state; and (b) a changing circuit for automatically changing said modes when a speed of change in the accumulation state detected by said monitoring means is lower than a predetermined speed.

12. A device according to claim 11, wherein said changing circuit changes the mode when the accumulation state detected by said monitoring means after the lapse of a predetermined time from the starting of the accumulation is a state lower than a predetermined accumulation value.

13. A device according to claim 11, wherein said changing circuit changes the mode when the difference between the accumulation states detected by said monitoring means after the lapse of a predetermined time from the starting of the accumulation and after the lapse of a further predetermined time is smaller than a predetermined value.

14. A focus detecting device or a distance detecting device having (1) a first mode in which light from an object is accumulated in a light receiving portion without light from a light source being projected onto the object and focus detection or distance calculation is effected on the basis of the accumulated output of said light receiving portion, and (2) a second mode in which by a light from a light source being projected onto the object, the light from the object is accumulated in said light receiving portion and focus detection or distance calculation is effected on the basis of the accumulated output of said light receiving portion, said light receiving portion comprising an accumulation type sensor having a plurality of photoelectric converting elements, each element of said sensor exhibiting an accumulation state conforming to a respective light receiving state, said device comprising:

(a) a detecting circuit for detecting a difference between the accumulation state in one of the elements of said sensor which exhibits the maximum accumulated state and the accumulated state in one of said elements which exhibits the minimum accumulated state; and (b) a changing circuit for automatically changing said modes when the difference detected by said detecting circuit is smaller than a predetermined value.

15. A device according to claim 14, wherein said detecting circuit detects the difference between the accumulation states in said elements after the lapse of a predetermined time from the starting of the accumulation.

* * * * *

UNITED STATES PATENT AND TRADEMARK OFFICE
CERTIFICATE OF CORRECTION

PATENT NO. : 4,992,817

DATED : February 12, 1991

INVENTOR(S) : Keisuke Aoyama et al.

It is certified that error appears in the above-identified patent and that said Letters Patent is hereby corrected as shown below:

COLUMN 1:

Line 17, "of a" should read --for a--.

COLUMN 3:

Line 61, "conveting" should read --converting--.

COLUMN 4:

Line 16, "smoothes" should read --smooths--.

Line 27, "to" should read --by--.

Line 28, "DC-making" should read --DC-conversion--.

Line 59, "conservation" should read --conservation,--.

COLUMN 5:

Line 64, "drawings Such" should read --drawings. Such--.

COLUMN 10:

Line 63, "However in" should read --However, in--.

UNITED STATES PATENT AND TRADEMARK OFFICE
CERTIFICATE OF CORRECTION

PATENT NO. : 4,992,817

DATED : February 12, 1991

INVENTOR(S) : Keisuke Aoyama et al.

It is certified that error appears in the above-identified patent and that said Letters Patent is hereby corrected as shown below:

COLUMN 13:

Line 5, "shift" should read --a shift--.

Line 36, "C" should read --c--.

COLUMN 14:

Line 24, "change" should read --changes--.

COLUMN 15:

Line 32, "judge-" should read --judg- --.

Signed and Sealed this

Sixth Day of August, 1991

Attest:

Attesting Officer

HARRY F. MANBECK, JR.

Commissioner of Patents and Trademarks